Dec. 26, 1944.  M. J. FLETCHER  2,365,946
ASH RECEPTACLE
Filed Jan. 5, 1942

INVENTOR.
Maurice J. Fletcher

Patented Dec. 26, 1944

2,365,946

UNITED STATES PATENT OFFICE 2,365,946

ASH RECEPTACLE

Maurice J. Fletcher, Des Moines, Iowa, assignor to Cadet Smokestands Company, Des Moines, Iowa, a business trust Application January 5, 1942, Serial No. 425,680

2 Claims. (Cl. 220—1)

The principal object of my invention is to combine a trap door hopper top and a receptacle for accomplishing the functions, in combination, of a manually operated trap door, a washable detachable container, a spring top urn or collar to prevent the displacement of the hopper, a pivoted bail and a yielding means for holding the receptacle within an urn.

More specifically the object of my invention is to provide a trap door hopper top with a receptacle attached thereto.

A further object of this invention is to provide an ash receptacle that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Heretofore smoking stands have been of three general types, the open type, the trapdoor and urn type, and the tube having an elongated tube leading into a receptacle. All of these types have certain disadvantages and particularly the tube type which relied on a restriction tube leading into a jar to prevent smoking. Any draft moving across the open end of the tube tends to draw the smoke and odors out of the jar and also permits live sparks to flame within the jar. Many tubes and jars are so constructed that a non manually operated shutter is placed at the lower end of the tube and within the jar in an unsatisfactory attempt to prevent these drafts from affecting the smoke and odor within the jar; this necessitates the utilization of a small tube of inadequate opening area to permit the disposition of refuse into the receptacle or jar. Such an arrangement has proven unsatisfactory where the tube and jar were loosely suspended from the top of the smokestand and are easily accidentally displaced from the smokestand. With the trapdoor and urn type of smoker, the trapdoor, urn and small disposal dish are in three separate pieces, not bound together, and therefore prone to separate when the smokestand is dumped over and will also separate when shipping the stand.

Thus it may be said that the tube and receptacle arrangement with its unreliable and sticking non-manually operated valve coupled with the inadequacy of the restricted tube have been one of the disadvantages of the industry while the loosely and separated component parts of the trapdoor type of smoker have also caused a great deal of grief in the smoker field. Neither of these types of smoker have had any means provided for inherently binding the elements together and creating a solid unit that will not spill, smoke, rattle or displace in normal use. Of the open type of smoker, little need be said. The visibility of the refuse, odor eminating therefrom and its susceptibility to spilling has condemned such a smokestand. The trapdoor type of smoker is also prone to permit gum and tobacco tar to build up therein and is difficult to clean. I have overcome all such disadvantages as will be appreciated and as will be hereinafter more fully set forth.

Figure 1:
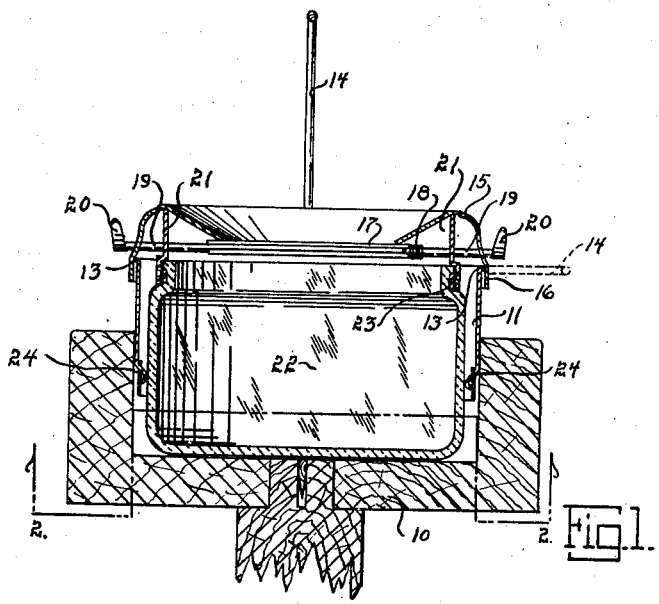
Fig. 1 is a side cross section of my ash receptacle ready for use.
Figure 2:
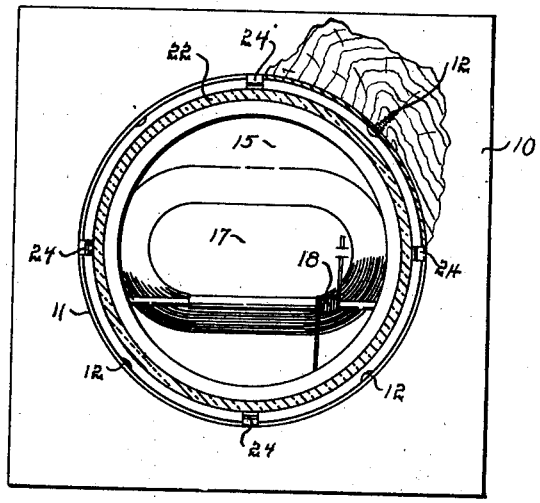
Fig. 2 is a bottom cross sectional view of my ash receptacle taken on the line 2—2 of Fig. 1.
Figure 3:
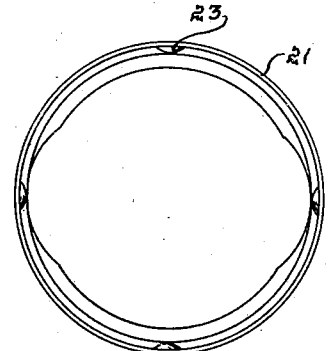
Fig. 3 is a bottom plan view of the receptacle attachment ring.
Figure 4:
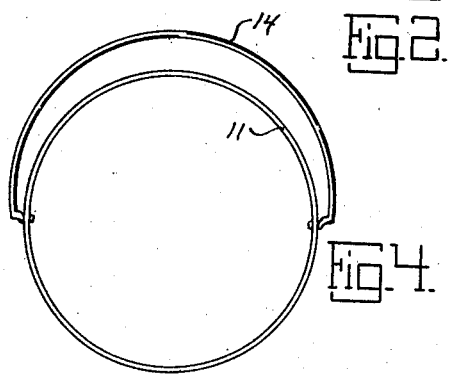
Fig. 4 is a top plan view of the housing cylinder with bail attached thereto.
Figure 5:
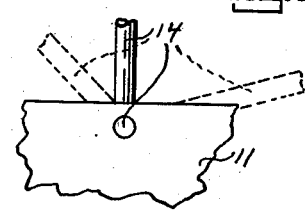
Fig. 5 is an enlarged view of the inside of a portion of the housing cylinder or collar showing the pivotal handle bail attachment.

Referring to the drawing, I have used the numeral 10 to indicate a bowl and column to which my improved smoker receptacle and top are secured. The numeral 11 indicates a sleeve or collar secured within the bowl 10, by means of drive screws or the like 12 as shown in Fig. 2. This collar 11 is capable of distortion under pressure and has, about its upper peripheral edge, the clipped or outwardly turned portion 13 as shown in Fig. 1. The numeral 14 indicates a handle bail having its end portions pivotally mounted in the collar 11 at diametrical opposite points as shown in Fig. 4. This handle bail 14 has sufficient inherent spring to distort the upper rim of the collar 11. The numeral 15 indicates a hopper top which in turn has a peripheral rim or flange 16 capable of fitting over the upper open end of the collar 11, and being held positively thereon by the distortion of the collar 11 under pressure of the pivoted or collapsible bail 14. The numeral 17 indicates a trap door positioned below an opening in the hopper top 15 and having thereon a spring member 18 for yieldingly holding the trap 17 in a closed position. The numeral 19 indicates rods operatively secured to the trap door 17, journaled within the hopper top 15, and having on their outer ends the hand operating means or trip levers 20. The numeral 21 indicates an attaching collar or ring having its upper end secured to the hopper top 15. The lower end of the attaching ring is so formed as to receive the upper open end of a jar or other container 22. This jar 22 may have its upper end secured to the ring 21 through usual engaging means, such as, bayonet lugs and grooves, screw threads, or the like. It will be noted that the collar or ring 21 may be used as an auxiliary bearing for the rod members or shafts 19 and that when the jar or container 22 is in place the only opening into the jar is through the opening closed by the trapdoor 17, thus the hopper top 15, attaching ring 21, and receptacle 22 become one unit and can be removed from the collar 11 when the bail 14 is swung to the position indicated by dotted lines in Fig. 1. I have shown lugs 23 on the attaching ring 21 designed to fit the ordinary bayonet grooves in the jar, glass container or other receptacle 22. The numerals 24 indicate a plurality of tension fingers formed on the lower portion of the collar member 11 and capable of yieldingly contacting the outer surface of the jar or container 22. These fingers 24 prevent the jar from rattling within the urn portion and insure a tight fit between the hopper top unit and the bowl of the smoke stand during shipment and when the stand is roughly handled. Any type of gripping means may be substituted for the fingers 24.

The practical operation of my device is as follows: The hopper top 15, with the attaching ring 21 secured therein, is secured to the jar or receptacle 22, thus making the trap door the cover to the receptacle 22. The unit is then placed within the collar or cylinder 11, which is secured to the bowl 10 and is held in position through the tension of the handle bail 14 while the jar 22 is centered and held against movement by the spring contact fingers 24. During the insertion of the hopper top unit within the receptacle, the handle bail 14 is pivoted downwardly so as to be clear of the top portion of the smoke stand. When the jar 22 is filled with ashes and other refuse the bail 14 is swung out of the way and the complete smoker unit removed. The jar or container is then removed from engagement with the attaching ring 21 and may then be washed or cleaned by ordinary methods.

It will be seen that I have provided a practical method of attaching a glass jar or other container to a tobacco ash receptacle and trap door so that the trap door acts as a closing means for the jar, the jar is held rigidly within the urn of the smoke stand, and one in which the bail may be pivoted while at the same time provides sufficient tension to securely hold the hopper top and the collar member 11.

Thus it will be seen that I have provided a smoke stand and receptacle which fulfills all of the objects and presents many and more advantages.

The cooperation between the distorted top and gripping means 24 prevent the hopper and jar from falling out of the collar or urn members.

Some changes may be made in the construction and arrangement of my improved smoking stand without departing from the real spirit and purpose of my invention, and it is my intention to cover by my claims any modified forms of structure or use of mechanical equivalents which may be reasonably included within their scope.

I claim:

1. In combination with a tobacco ash receptacle having a supporting column and bowl member, a collar element designed to be secured within said bowl and having its upper end capable of being distorted, a spring handle pivotally mounted on said collar, a hopper top embracing the upper portion of said collar element, a manually operated trap door in said hopper top capable of closing an opening therein at times, an attachment ring inside said hopper top, a receptacle, a means for detachably securing the open end of said receptacle to said attachment ring, and a plurality of spring tension fingers formed about the lower portion of said collar yieldingly contacting said receptacle when said receptacle and said hopper top are in place within said collar and said bowl member.

2. In a smoking stand, a collar element, a means for supporting said collar element, a hopper top on the upper end of said collar element, an opening in said hopper top, a manually operated trap door in said hopper top for closing said opening at times, a spring handle bail pivotably mounted in said collar and capable of distorting said collar for holding said hopper top in place thereon, a receptacle secured to said hopper top directly below the opening therein and a means for yieldingly holding said receptacle in position relative to said collar.

MAURICE J. FLETCHER.